Patented July 24, 1951

2,562,090

UNITED STATES PATENT OFFICE 2,562,090

POLYMERIZATION OF DIBROMOBUTENE

Frederick E. Frey and Francis E. Condon, Bartlesville, Okla., assignors to Phillips Petroleum Company, a corporation of Delaware No Drawing. Application July 26, 1948, Serial No. 40,797

4 Claims. (Cl. 260—91.7)

This invention relates to new polymeric substances and their preparation. In one of its more specific aspects, it relates to reacting organic polyhalides with an alkali metal so as to produce a solid polymeric material. Still another of its more specific aspects relates to a new method of polymerizing certain organic polyhalides by reacting the polyhalides dispersed in an inert reaction medium with an alkali metal so as to produce a solid polymeric material.

It is well known that the preparation of a polymeric substance depends to a great extent upon the manner in which the polymerization of the monomer is carried out. For example, butadiene can be converted to a synthetic rubber, or to a cyclic dimer (vinyl cyclohexene), or to a viscous oil, or to a resin, depending upon how the polymerization is conducted. Each of these substances has properties which make it useful for applications for which another polymer produced in a different way is wholly unsuited; consequently, novel methods of producing polymeric substances are valuable. In certain reactions such as a reaction between a metal and an organic halide, e. g., a reaction between an alkali metal and an organic polyhalide, the product formed depends to a great extent on the conditions under which the reaction takes place. For instance, one would expect a diene, or a cyclodiene, or a simple two-molecule-condensation compound to be formed when an alkali metal is reacted with an organic polyhalide, but we have discovered that solid polymeric substances can be produced in good yield by reacting a metal such as sodium with certain organic polyhalides such as a dihalide chosen from the group with the general formula, $XCR_2CR'=CR'CR_2X$, where each R is an alkyl group or hydrogen, R' is a methyl group or hydrogen and X is a halogen. We have found that these polymeric substances are formed when the reaction is carried out in a reaction medium or solvent for the polyhalide which is inert to the halide and to the metal.

One object of the present invention is to prepare new polymeric substances. Another object is to react organic polyhalides with an alkali metal so as to produce new polymeric substances. Still another object is to control the reaction between an alkali metal and a compound of the type represented by the formula $XCR_2CR'=CR'CR_2X$, in which each R is an alkyl group or hydrogen, R' is a methyl group or hydrogen and X is a halogen, so as to produce a solid polymeric material. Still other objects will become apparent, to one skilled in the art, from the accompanying discussion and disclosure of the invention.

We have found that if certain organic polyhalides are reacted with certain metals, namely alkali metals, in a reaction medium, which is inert to the metal and the polyhalide, and in which the polyhalide is soluble, new and useful polymeric materials are formed as products. These polymeric materials are useful as plastics, plasticizers, or modifiers of such properties as the viscosity index, the melting point, the pour point, etc. of other materials. In polymerizing a particular polyhalide represented by the aforementioned formula, $XCR_2CR'=CR'CR_2X$, where each R is hydrogen or an alkyl group, R' is a methyl group or hydrogen and X is a halogen, we have found that it is advisable to limit the alkyl groups represented by R to alkyl groups containing no more than three carbon atoms per molecule; also it is preferred that X be either chlorine or bromine. Preferred monomeric materials include 1,4-dibrom-2-butene, 1-4-dichlor-2-butene, 1,4-dibrom-1-methyl-2-butene, 1,4-dibrom-2-methyl-2-butene, and the like.

Our reaction is carried out in a reaction medium or solvent for the polyhalide which is inert to the polyhalide and the alkali metal. In carrying out the reaction at atmospheric pressure, a hydrocarbon or mixture of hydrocarbons boiling in the range from 25° to 200° C. and inert to the metal and the polyhalide may be used. Examples of such hydrocarbons or mixtures of hydrocarbons which are suitable are heptanes, octanes, decanes, paraffinic naphtha fractions, gasoline fractions, or the like, xylene, benzene, or the like. The reaction medium or solvent should not contain any diolefins or acetylenes. We prefer to carry out the reaction in an inert hydrocarbon or mixture of hydrocarbons containing hydrocarbon molecules having from 6 to 9 carbon atoms per molecule. However, the reaction medium is not critical so long as it is inert to the alkali metal and to the polyhalide and so long as the polyhalide is miscible with the reaction medium.

In carrying out our reaction, we use an alkali metal in the metallic form. The granules of the metal can be any size. However, the process or reaction can be carried out at a more rapid rate if the metal granules are relatively small. We prefer to use a granular metallic alkali metal of size from 5 to 350 mesh. We prefer to use metallic sodium in carrying out the reaction, but any alkali metal will work. Agitating the reaction mixture aids the reaction, more perfect equilibrium is obtained and the reaction proceeds at a greater rate. Also, a fine dispersion of the alkali metal in the reaction medium can be obtained if the metallic alkali metal is added to the reaction medium, the resulting mixture of the two heated to a temperature above the melting point of the alkali metal, and agitated so as to disperse the molten metal throughout the medium.

In carrying out our reaction, the reactants may be admixed in any manner with the exception that the alkali metal should not be added to the polyhalide until it has been dispersed in the reaction medium, since it is unlikely that the desired polymer will be formed if the reaction is carried out in the absence of a dispersing medium. Our preferred way of carrying on the process is to add the metallic alkali metal to the inert reaction medium, then add the polyhalide, and reflux the mixture, the reaction taking place at the boiling temperature of the mixture. The reaction should not be carried out at a temperature greater than 200° C. We prefer to carry out the reaction at a temperature of from 50 to 120° C. The amount of the reaction medium relative to the polyhalide is not critical; however, we prefer to use at least one-half of a volume of the reaction medium to one volume of the polyhalide. Our preferred minimum of alkali metal to polyhalide is two mols of the alkali metal to one mol of the polyhalide. Reactants in any proportions will give the desired result. However, the reaction will be carried more nearly to completion if our preferred minimum is used.

The reaction may be carried out under any pressure. The pressure and the velocity of inert reaction medium may be correlated so that the reaction can be carried out at any given temperature, that is, a volatile reaction medium may be used at a super-atmospheric pressure or a non-volatile reaction medium may be used at a sub-atmospheric pressure.

The product of the reaction may be recovered and separated from the reaction mixture in numerous ways. For instance, the reaction mixture may be filtered and the solid polymer washed free of sodium bromide and sodium with water or alcohol.

Advantages of this invention are illustrated by the following example. The reactants, the proportions, the product, and other specific conditions are presented as being typical and should not be construed to limit the invention unduly.

Example

Five grams of sodium metal was added to 100 cc. of normal heptane and heated to the boiling point of the heptane. 20.5 grams of 1,4-dibrom-2-butene dissolved in 100 cc. of warm normal heptane was slowly added with stirring to the mixture of sodium metal and normal heptane. The reaction mixture was allowed to stand for a short time. 50 c. c. of water was then added to dissolve the sodium bromide formed. Upon filtering, a brown, fluffy solid was obtained, dry weight, 4.5 grams (90% of the bromine-free part of 1,4-dibrom-2-butene). This polymer was analyzed by the Shell-Braun method and was found to contain 6.95 per cent bromine. However, after it was washed once with boiling water, the polymer contained only 1.7 to 3.6 per cent bromine. Since the bromine content was reduced with one washing from 6.95 per cent to 1.7–3.6 per cent bromine, it is believed that the bromine contained in the polymer was occluded sodium bromide. We offer this only as an opinion and do not want to be bound as saying that the polymer contained occluded bromine only in the form of sodium bromide.

As will be evident to those skilled in the art, various modifications of this invention can be made, or followed, in the light of the foregoing disclosure and discussion, without departing from the spirit or scope of the disclosure or from the scope of the claims.

We claim:

1. The process of producing a solid polymeric material from a compound having the formula $XCR_2CR'=CR'CR_2X$, in which each R represents a member of the group consisting of an alkyl group containing no more than 3 carbon atoms and hydrogen, R' is a methyl group or hydrogen and X represents a halogen, which comprises, reacting said compound with an alkali metal at a temperature not greater than 200° C. while said compound is dissolved in a liquid reaction medium which is inert to said compound and said alkali metal, and miscible with said compound, and recovering a resulting solid polymeric material as a product of said process.

2. The process of producing a solid polymeric material from a compound having the formula $XCR_2CR'=CR'CR_2X$, in which each R represents a member of the group consisting of an alkyl group containing no more than 3 carbon atoms and hydrogen, R' is a methyl group or hydrogen and X represents a halogen, which comprises, reacting said compound with an alkali metal at a temperature of 50° C. to 120° C. while said compound is dissolved in at least one liquid hydrocarbon which is inert to said compound and said alkali metal, and miscible with said compound, and recovering a resulting solid polymeric material as a product of said process.

3. The process of producing a solid polymeric material from 1,4-dibrom-2-butene, which comprises, reacting 1,4-dibrom-2-butene with an alkali metal at a temperature no greater than 200° C. while said 1,4-dibrom-2-butene is dissolved in at least one liquid hydrocarbon which is inert to said 1,4-dibrom-2-butene and said metal and miscible with said 1,4-dibrom-2-butene, and recovering a resulting solid polymeric material as a product of said process.

4. The process of producing a solid polymeric material from 1,4-dibrom-2-butene, which comprises, reacting said 1,4-dibrom-2-butene with 5 to 350 mesh, metallic, sodium granules at a temperature of 50° C. to 120° C. while said 1,4-dibrom-2-butene is dissolved in at least one liquid paraffin hydrocarbon containing from 6 to 9 carbon atoms, and recovering a resulting brown, fluffy, solid polymeric material as a product of said process.

FREDERICK E. FREY.
FRANCIS E. CONDON.

REFERENCES CITED

The following references are of record in the file of this patent:

UNITED STATES PATENTS

| Number | Name | Date |
|---|---|---|
| 2,038,593 | Muskat | Apr. 28, 1936 |
| 2,102,611 | Carothers | Dec. 21, 1937 |

OTHER REFERENCES

Ellis: "Chemistry of Synthetic Resins," page 161, 162, Reinhold (1935).

S. N. Khitrik, J. Gen. Chem. (U. S. S. R.), 10, 2098–2100 (1940), abstracted in C. A. 35, 3961-2 (1941).

Ya M. Slobodin, J. Gen. Chem. (U. S. S. R.), 8, 714–718 (1938), abstracted in C. A. 33, 1316 (1939).

Certificate of Correction

Patent No. 2,562,090                                                        July 24, 1951

FREDERICK E. FREY ET AL.

It is hereby certified that error appears in the printed specification of the above numbered patent requiring correction as follows:

Column 3, line 31, for "velocity" read *volatility*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*